March 14, 1961 P. P. THOMAS 2,974,975
BEARING JOINTS AND ROD ASSEMBLY
Filed May 9, 1956 2 Sheets-Sheet 1
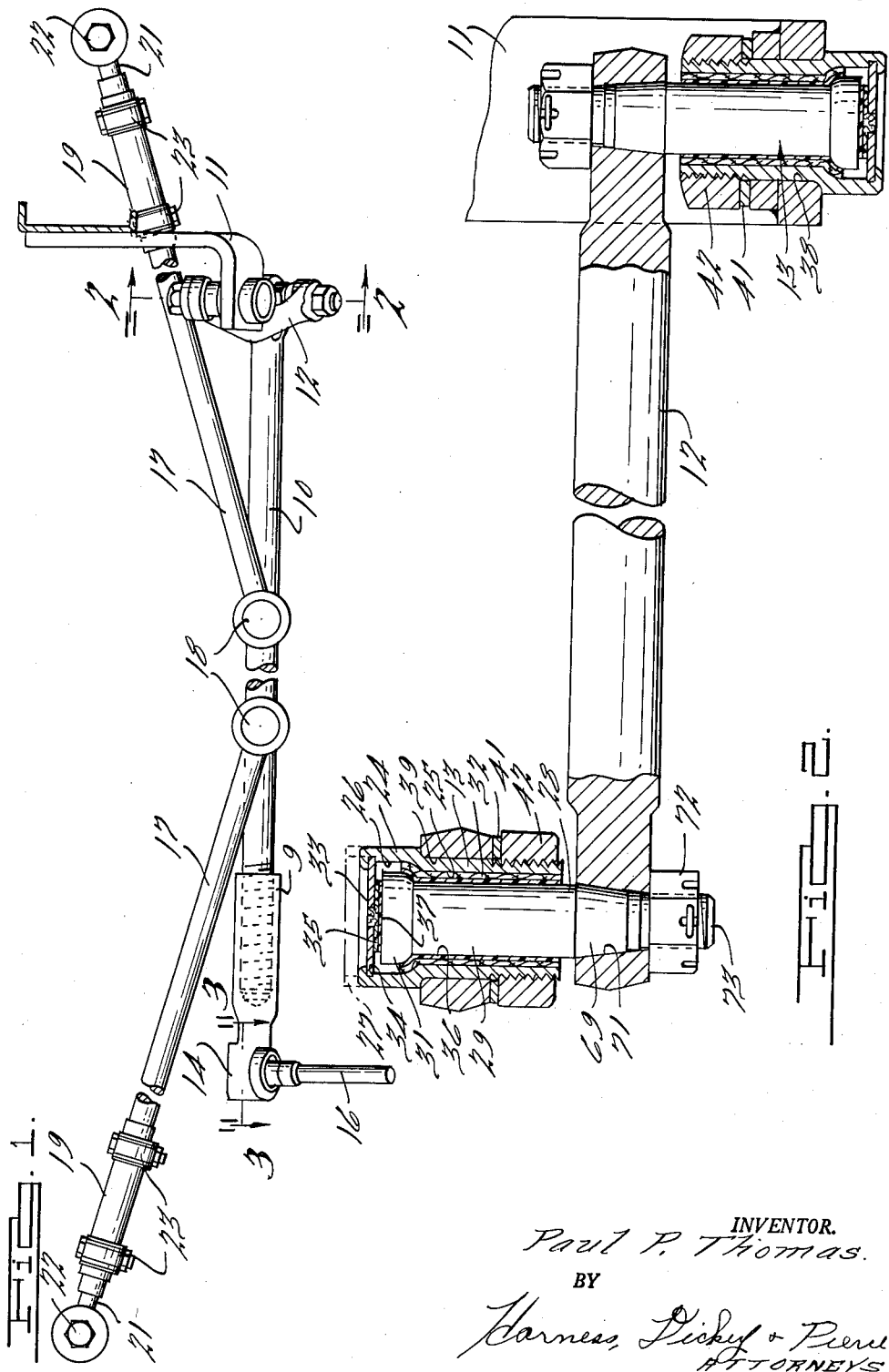
INVENTOR.
Paul P. Thomas.
BY
Harness, Dickey & Pierce
ATTORNEYS

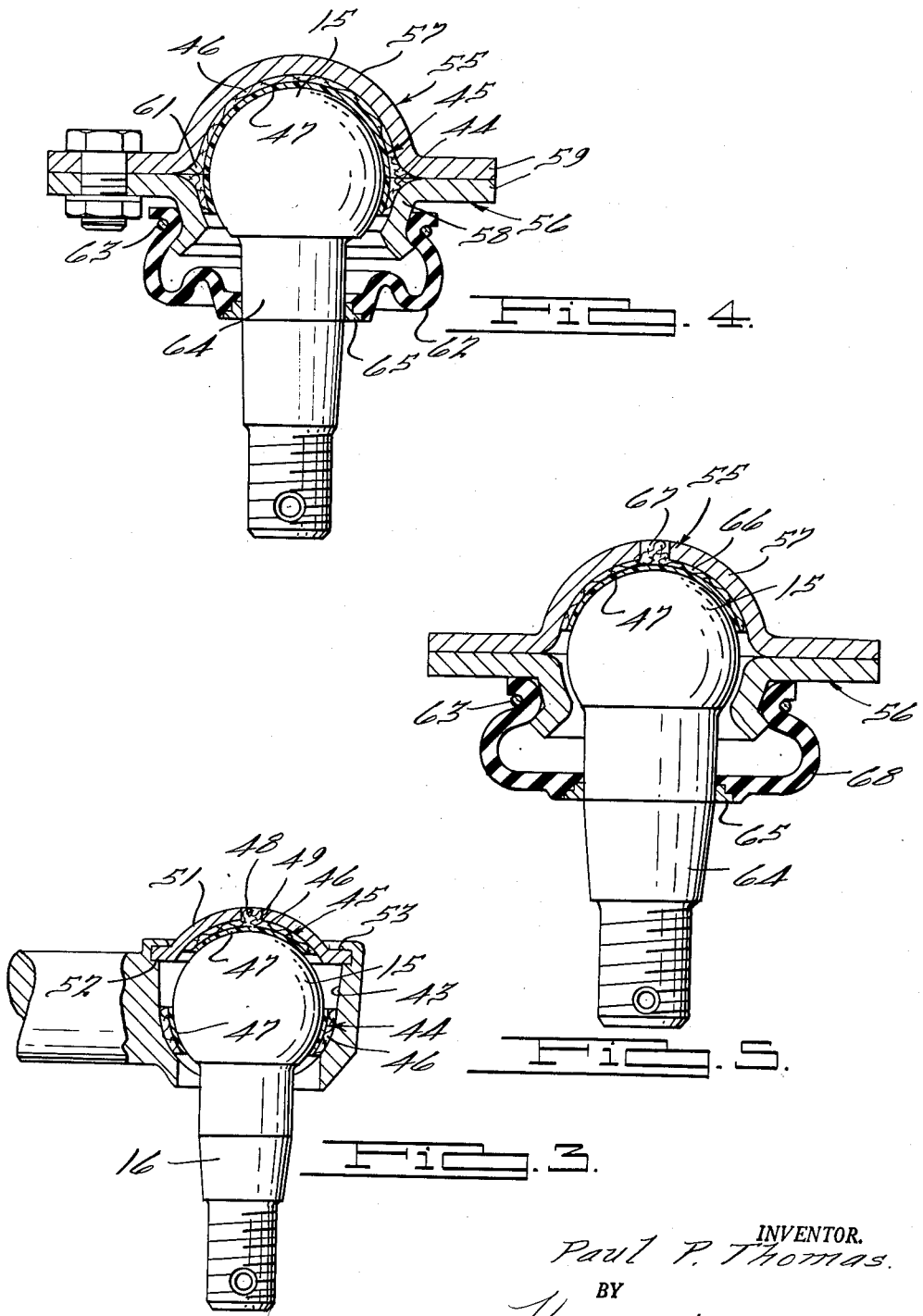

United States Patent Office 2,974,975
Patented Mar. 14, 1961

2,974,975

BEARING JOINTS AND ROD ASSEMBLY

Paul P. Thomas, Detroit, Mich., assignor to American Metal Products Company, Detroit, Mich., a corporation of Michigan Filed May 9, 1956, Ser. No. 583,655

8 Claims. (Cl. 280—95)

This invention relates to joints for rods, and particularly to joints and rods employed in a vehicle steering mechanism.

Joints of the ball and socket type have been employed in the wheel support of a vehicle in which the ball or the socket is accurately machined to provide a polished surface which mates with a low friction resin surface which is formed thereabout under heat and pressure at the time of assembly. Primarily, the joint is so constructed that pressure is applied when the assembly is heated to accurately shape the resin material into surface engagement with the polished surface, with further pressure added while heated. In the arrangement of the present invention, the joints are similarly constructed, having one of the elements provided with a polished surface to mate with the low friction surface of a resin insert which is pressed between the two elements to have it conform to the polished surface in mated relation thereto. The two members are heated above a temperature required to render the resin insert pliable so that when the heated elements are assembled with the pliable material, the pliable material will become formable and will be shaped to accurately mate with the polished surface when pressure is applied thereto during assembly. Upon the cooling of the parts, an area engagement is maintained between the resin and polished surface under a predetermined pressure, requiring no further pressure, so that the elements may be secured together in permanent relation to each other by welding or by other means at the time the pressure is applied while the members are in heated condition.

In the device herein illustrated the joints are of the ball and the sleeve types as employed in the connection of the steering rods of a steering mechanism for reducing the steering friction and the effort required to steer the wheels of the vehicle. A cross rod is employed which has a ball joint at one end for attachment to the steering mechanism to provide endwise movement. The opposite end of the cross rod is suspended upon a link by a sleeve joint and the opposite end of the link is connected to a bracket by a second sleeve joint, the bracket being attached to the chassis frame or other point of the vehicle. Medially of the ends of the cross rod, a pair of ball joints is secured which connects the ends of a pair of rods which have ball joints on the outer ends having connection to the steering arms of the wheels for turning the wheels in one or the other direction when the cross rod is moved endwise. Friction is reduced to a minimum at the various joints by the use of a facing of low friction resin material in engagement with the polished surface of a mating part. The resin material is preferably of the fluorocarbon type which has low friction characteristics.

Accordingly, the main objects of the invention are: to provide a plurality of joints for an assembly of steering links and rods which have a polished surface in mated relation with a low friction resin material; to provide a steering assembly with a plurality of joints having minimum friction due to the area engagement and accurate mating relation between a polished metal surface and the surface of a low friction resin material; to produce joints for a steering assembly and the like by heating the metal parts of the joints and assembling the parts with resinous inserts in the joints which when heated from the heat of the parts are formed to the polished surface under pressure, at which time the parts are secured together, and, in general, to provide a group of rods with low friction joints which are simple in construction and economical of manufacture.

Other objects and features of novelty of the invention will be specifically pointed out or will become apparent when referring, for a better understanding of the invention, to the following description taken in conjunction with the accompanying drawings, wherein:

Figure 1 is a plan view of a series of rods connected by joints, embodying features of the present invention;

Fig. 2 is an enlarged broken sectional view of the structure illustrated in Fig. 1, taken on the line 2—2 thereof;

Fig. 3 is a sectional view of the joint illustrated in Fig. 1, taken on the line 3—3 thereof;

Fig. 4 is a sectional view of a joint, similar to that illustrated in Fig. 3, showing another form thereof; and Fig. 5 is a view of a joint, similar to that illustrated in Fig. 4, showing a further form which the invention may assume.

Referring to Figs. 1 to 3, a longitudinally movable cross rod 10 has one end supported on a bracket 11 by a link 12 and a pair of like joints 13. The opposite end of the rod 10 may have a socket 14 directly provided thereon or may, as herein illustrated, be an extension of an internally threaded sleeve 9 which is adjustably threaded on the threaded end of the rod 10, and locked thereon by a nut (not shown). The socket 14, containing a ball 15, has the stud end 16 secured to the operating portion of the steering column to produce the lateral movement thereof and the endwise movement of the rod 10. Medially of the ends of the rod 10, a pair of rods 17 is connected thereto by ball and socket connections 18 which are similar to the ball and socket connection 14. The opposite outer ends of the rods are threaded and have internally threaded sleeves 19 adjustably secured thereon. The outer ends of the sleeves 19 receive the threaded end 21 of a ball and socket joint 22 which is also similar to the joints 14 and 18. Clamping bands 23 secure the sleeves 19 to the threaded ends of the rods 17 after adjustment in length is made. The studs 16 of the ball and socket joints 22 are connected to the operating arms of the wheel supporting yokes which are steered thereby. This construction is believed to be unique since the rods 10 and 17 may be adjusted in length to accurately locate the end ball joints relative to the elements to which they are to be joined. The further novelty resides in the ball joints 14, 18 and 22 and also in the sleeve joints 13.

The sleeve joints 13 are constructed from an outer cylindrical element 24 having an internal aperture 25 enlarged at the upper end at 26. An outer extended flange 27 is provided on the upper end of the cylindrical member 24. A stud 28 has a polished cylindrical surface 29, as well as an enlarged polished head 31 which extends within the cylindrical member 24. A resin insert 32 of cylindrical shape is disposed over the polished surfaces of the cylinder 29 and the head 31 and inserted into the aperture 25 and enlarged portion 26 after the stud and cylindrical element have been heated above the temperature for softening the resin insert 32. If the resin insert is to be softened and shaped at approximately 300° F. temperature, then the metal parts are normally heated to around 450°. When assembled in the presence of heat into the relationship substantially as that illustrated in Fig. 2, pressure is applied to the ends of the insert 32 to cause it to compress and accurately engage the spaced surfaces of the stud and cylindrical members with a predetermined pressure. Thereafter, a washer 33 is placed upon a shoulder 34 formed between the enlarged aperture 26 and the flange 27, with a cylindrical resin insert 35 disposed between the inner surface of the washer and the end of the head 31 to maintain the pressure between the stud and its head with the resin insert 32 while heat is present in the stud and cylindrical member and the flange 27 is rolled over to maintain the washer 33 fixed to the shoulder, as clearly illustrated in the figures. With this arrangement, the resin will be bonded or physically anchored to the inner surfaces of the apertures 25 and 26 and will provide a bearing surface 36 which is accurately mated with the polished surface 29 of the stud and its head 31. Endwise movement is prevented by the insert 35 which has a face 37 of low friction material engaging the end surface of the head 31. Upon cooling, the parts remain in accurately mated relationship under a predetermined pressure which provides a tight joint having low friction characteristics.

The low friction characteristics of the joint are provided by the engagement of the low friction material 36 and 37 with the engaged polished surfaces of the stud 28. This material is preferably a fluorocarbon resin. A backing portion of sheet or mascerated material bonded by a resin is bonded to the monofluoro surface material 36 in a state which permits the insert to soften sufficiently to be formed to and accurately mated with the polished surfaces of the stud 28 when the stud and cylindrical member 24 are heated and the insert disposed therebetween. The formation occurs under pressure applied between the stud and cylindrical member and the ends of the sleeve, so that the top end may be closed by the washer 33 and insert 35 which applies downward pressure to the head 31, all of which are retained under pressure relation by the rolling over of the flange 27, as illustrated in the figure. The fluorocarbon surface 36 has low friction characteristics so that a perfect dry bearing relationship exists between the polished surfaces of the stud 28 and head 31 with the mating low friction material. After the cooling of the parts 24 and 28, the bearing relationship maintains between the surfaces and the insert under a predetermined pressure provided in the assembly.

As clearly illustrated in Fig. 2, each of the sleeve type bearings 13 is secured to the link 12, with the cylindrical member 24 secured in an aperture 38 in the bracket 11 and in the aperture 39 in the end of the rod 10. The cylindrical member 24 is retained in position by nuts 41 and 42 which are threaded on the threaded end of the member.

The inner ends of the rods 17 are provided with a semicylindrical socket 43 in which the ball 15 is secured for universal movement. A resin insert 44 engages the polished surface of the ball 15 below the center thereof, while an insert 45 engages the top portion of the ball. The inserts have a body portion 46 built up of resin in sheet, mascerated and like form and a surface 47 of low friction material which engages the polished surface of the ball. The insert 45 has an outwardly projecting stud portion 48 which extends through an aperture 49 in a cap 51 which rests upon a shoulder 52 on the socket 43. After heating the ball 15 and socket end 43 of the rod 17, the inserts 44 and 45 are disposed in position between the ball and the socket and pressure is applied between the bottom of the socket and the top of the cap 51 which compresses the material of the inserts and forms them into accurate mated relation with the polished surface of the ball 15. While in this pressed relationship, a flange projecting upwardly from the shoulder 52 is rolled over to form a locking flange 53 which retains the inserts in mated relation to the ball under predetermined pressure. Upon the cooling of the ball and socket end of the rod, the pressure remains between the inserts and ball and the ball is free to turn within the socket in view of the low friction surface 47 in engagement with the polished surface of the ball. This low friction surface or layer is preferably made from a fluorocarbon resin or any other resin having similar low friction characteristics secured to a backing portion 46 of the insert. The heating of the parts, as pointed out above, is to such a degree as to provide heat to the unheated inserts sufficient to permit them to be shaped and formed into accurate mating relation with the spherical surface of the ball, which relationship will obtain, as pointed out above, upon the cooling of the parts.

In Fig. 4 a similar ball joint is illustrated, wherein the socket is formed of a pair of stampings 55 and 56 having spherical portions 57 and 58 and mating flange portions 59. A pair of the inserts 44 and 45 are provided about the polished ball 15 and the ball and stampings are heated and assembled with the inserts which will become heated sufficiently to be formed to mate accurately with the ball when pressure is applied between the two stampings to bring the flanges 59 together, as illustrated in Fig. 5, so that they may be welded together to form a unit construction. Proper pressure is provided between the ball and insert by providing the necessary thickness thereto, the body portion 46 of which may flow outwardly to fill the area 61 at the inner junction between the spherical portions 57 and 58 of the stampings. Upon the cooling of the ball and the assembled socket stampings, sufficient pressure will be maintained between the ball and the low friction surface 47 of the insert as will require a predetermined force to move the ball within the socket. It is to be understood, however, that by using the low friction face 47 on the insert, the breakaway force is substantially no greater than the operating force required to move the ball within the socket. A sealing sleeve 62 of flexible material and corrugated shape may be secured to the stamping 56 by a ring 63 and to the stud 64 of the ball by a ring 65. The sealing sleeve 62 prevents the entrance of dirt and grime within the area of the polished surface of the ball 15.

In Fig. 5 a ball joint is illustrated which is similar to that illustrated in Fig. 4, with the exception that a top insert 66 is employed which is utilized for supporting a load from the top and not from the bottom, as is capable of being supported by the joint 4. In this arrangement, pressure is provided between the top stamping 55 and the ball 15 to produce the shaping of the insert to the ball before or after the two stampings 55 and 56 are secured together by welding, bolting or the like. In this arrangement, the insert 66 is provided with a stud portion 67 which projects through an aperture in the stamping 55. This prevents the lateral shifting of the insert and though it may turn on the center of the stud 67 when not bonded to the stamping 55, in view of the greater friction relationship between the insert and stamping than that between the low friction face 47 and the polished surface of the ball 15, this will not occur in practice.

In the structure illustrated in Fig. 4, the extension of the base material within the area 61 between the inner portion of the stampings maintains the inserts against lateral shifting or rotation relative thereto. It is to be understood that the inner surface of the stampings may be slotted or roughened to prevent such relative movement or that the backing material may be actually bonded to the inner metal face of the stampings. The stamping 56 of the assembly illustrated in Fig. 5 has the opening thereof enclosed by a seal 68 which is similar to the seal 62 and is retained thereon by a ring 63 and to the stud 64 by a ring 65. While the polished surface of the ball may separate from the low friction material 47 in the assembly of Fig. 5, nevertheless when assembled on a vehicle or otherwise supported, the ball and the low friction material will be retained in engagement under a downward load on the stamping 55. The ball may move in the socket formed by the stamping 55 with very little resistance in view of the polished surface of the ball and the low friction characteristic of the surface of the insert. In assembly, the ball and stampings are heated and assembled with the insert so that it will be heated by the time the pressure is applied thereto so that it will readily form into the accurate mated relation with the ball. Where the term "fluorocarbon resin" is recited herein and in the claims, it is intended to include all of the polymerized materials which are obtained by the polymerization of fluorocarbons including perfluorocarbons and partially substituted fluorocarbons, e.g., the chloro, bromo or nitro-substituted fluorocarbons.

In any of the arrangements, the steering rods employed with the steering mechanism of the vehicle are coupled together by low friction joints which form a positive connection between the ends of the rods, the steering mechanism, the support for the rod, and the arm of the wheel supporting yokes, so that the system will operate at all times with the lowest amount of effort and without substantially any wear. All of the rods are provided with threaded ends so that adjustment may be made to accurately position the joints on the ends thereof so that the wheels will track and will be turned the same amounts in either direction through the longitudinal movement of the cross rod. The one end of the cross rod is connected to a supporting bracket through the links 12 and the sleeve bearings 13, the projecting ends of the studs 28 having a tapered portion 69 which mates with a tapered surface of apertures 71 at the opposite ends of the link 12. The studs 28 are secured in position within the apertures 71 by nuts 72 threaded on the projecting ends 73 of the studs. The whole assembly is flexible relative to movement and adjustment and tight joints are assured which have long life in view of the engagement of the polished metal surface with a mating low friction resin surface which has a pressure engagement over a large area provided therebetween.

What is claimed is:

1. A steering assembly including, in combination, a transversely movable rod, a link suspending one end of said rod for swinging movement, a bracket for supporting said link, a pair of bearings one secured to the end of the rod the other to the bracket, a rotatable stud in each of said bearings, a low friction resin about said studs within said bearings, each of said studs being rigidly secured to an end of said link, a sleeve threaded on the opposite end of the rod, a socket in said sleeve, a ball supported in said socket for universal movement, a pair of laterally extending tie rods operated by said movable rod, and means for pivotally connecting the adjacent ends of the tie rods to the movable rod near the center thereof, said last-mentioned means including a stud projecting from the adjacent ends of each of said tie rods and connected to the movable rod, the outer ends of said tie rods being connectible to the operating portion of wheels to be steered.

2. A steering assembly including, in combination, a transversely movable rod, a link suspending one end of said rod for swinging movement, a bracket for supporting said link, a pair of bearings one secured to the end of the rod the other to the bracket, a rotatable stud in each of said bearings, each of said studs being rigidly secured to an end of said link, a sleeve threaded on the opposite end of the rod, a socket in said sleeve, a ball supported in said socket for universal movement, a low friction resin material in engagement with the ball and studs in accurate mated relation therewith, a pair of laterally extending tie rods operated by said movable rod, and means for pivotally connecting the adjacent ends of the tie rods to the movable rod near the center thereof, said last-mentioned means including a stud projecting from the adjacent ends of each of said tie rods and connected to the movable rod, the outer ends of said tie rods being connectible to the operating portion of wheels to be steered.

3. A steering assembly including, in combination, a transversely movable rod, a link suspending one end of said rod for swinging movement, a bracket for supporting said link, a pair of bearings one secured to the end of the rod the other to the bracket, a rotatable stud in each of said bearings, a low friction resin about said studs within said bearings, each of said studs being rigidly secured to an end of said link, a sleeve threaded on the opposite end of the rod, a socket in said sleeve, a ball supported in said socket for universal movement, a pair of laterally extending rods operated by said laterally movable rod, sockets formed in the adjacent ends of the rods, balls within the sockets having studs, means for rigidly connecting the studs to the transversely movable rod adjacent the center thereof, and means on the opposite ends of said rods connectible to the operating portion of wheels to be steered.

4. A steering assembly including, in combination, a transversely movable rod, a link suspending one end of said rod for swinging movement, a bracket for supporting said link, a pair of bearings one secured to the end of the rod the other to the bracket, each of said bearings comprising a cylindrical element having an internal aperture extending therethrough and enlarged at one end thereof, a rotatable stud extending within said aperture from the other end thereof and having an enlarged head on the end thereof disposed within said enlarged end of the aperture, an end cover enclosing said one end of said cylindrical element to retain the stud therein, low friction material disposed between said end cover and the end of said stud adjacent thereto and between the cylindrical surface of the stud and cylindrical element to enable the stud to freely rotate therein, each of said studs being rigidly secured to an end of said link, a sleeve threaded on the opposite end of the rod, a socket in said sleeve, a ball supported in said socket for universal movement, a pair of laterally extending rods operated by said laterally movable rod, sockets formed in the adjacent ends of the rods, balls within the sockets having studs, means for rigidly connecting the studs to the transversely movable rod adjacent the center thereof, and means on the opposite ends of said rods connectible to the operating portion of wheels to be steered.

5. A steering assembly including, in combination, a transversely movable rod, a link suspending one end of said rod for swinging movement, a bracket for supporting said link, a pair of bearings one secured to the end of the rod the other to the bracket, a rotatable polished stud in each of said bearings, each of said studs being rigidly secured to an end of said link, a sleeve threaded on the opposite end of the rod, a socket in said sleeve, a polished ball supported in said socket for universal movement, low friction resin material in engagement with the polished ball and studs which provides lubricating properties therefor, a pair of laterally extending rods operated by said laterally movable rod, sockets formed in the adjacent ends of the rods, balls within the sockets having studs, means for rigidly connecting the studs to the transversely movable rod adjacent the center thereof, the opposite ends of said rods being threaded, sockets having threaded stems thereon adjustably secured to the threaded ends of the rods, polished balls within the sockets having studs thereon which are connectible to the operating portion of wheels to be steered, and low friction resin material in engagement with the last said polished balls which provides substantially all of the lubricating properties for the balls and eliminates the seals for retaining a lubricant within the sockets therefor.

6. A steering assembly including, in combination, a transversely movable rod, a link suspending one end of said rod for swinging movement, a bracket for supporting said link, a pair of bearings one secured to the end of the rod the other to the bracket, a rotatable polished stud in each of said bearings, each of said studs being rigidly secured to an end of said link, a sleeve threaded on the opposite end of the rod, a socket in said sleeve, a polished ball supported in said socket for universal movement, low friction resin material in engagement with the polished ball and studs which provides lubricating properties therefor, a pair of laterally extending rods operated by said laterally movable rod, sockets formed in the adjacent ends of the rods, balls within the sockets having studs, means for rigidly connecting the studs to the transversely movable rod adjacent the center thereof, the opposite ends of said rods being threaded, sockets having threaded stems thereon adjustably secured to the threaded ends of the rods, polished balls within the sockets having studs thereon which are connectible to the operating portion of wheels to be steered, and low friction resin material in engagement with the last said polished balls, including a low friction surface of a fluorocarbon resin which eliminates the lubricant heretofore employed.

7. A steering assembly including, in combination, a transversely movable rod, a link suspending one end of said rod for swinging movement, a bracket for supporting said link, a pair of bearings one secured to the end of the rod the other to the bracket, a rotatable polished stud in each of said bearings, each of said studs being rigidly secured to an end of said link, a sleeve threaded on the opposite end of the rod, a socket in said sleeve, a polished ball supported in said socket for universal movement, low friction resin material in engagement with the polished ball and studs which provides lubricating properties therefor, a pair of laterally extending rods operated by said laterally movable rod, sockets formed in the adjacent ends of the rods, balls within the sockets having studs, means for rigidly connecting the studs to the transversely movable rod adjacent the center thereof, the opposite ends of said rods being threaded, sockets having threaded stems thereon adjustably secured to the threaded ends of the rods, polished balls within the sockets having studs thereon which are connectible to the operating portion of wheels to be steered, and low friction resin material in engagement with the last said polished balls which maintains the polished balls operable without the use of seals for retaining a lubricant.

8. A steering assembly including, in combination, a transversely movable rod, a link suspending one end of said rod for swinging movement, a bracket for supporting said link, a pair of bearings one secured to the end of the rod the other to the bracket, a rotatable polished stud in each of said bearings, each of said studs being rigidly secured to an end of said link, a sleeve threaded on the opposite end of the rod, a socket in said sleeve, a polished ball supported in said socket for universal movement, low friction resin material in engagement with the polished ball and studs which provides lubricating properties therefor, a pair of laterally extending rods operated by said laterally movable rod, sockets formed in the adjacent ends of the rods, balls within the sockets having studs, means for rigidly connecting the studs to the transversely movable rod adjacent the center thereof, the opposite ends of said rods being threaded, sockets having threaded stems thereon adjustably secured to the threaded ends of the rods, polished balls within the sockets having studs thereon which are connectible to the operating portion of wheels to be steered, and low friction resin material in engagement with the last said polished balls, the low friction surface of said resin material being a fluorocarbon which requires no lubricant and no sealing elements for a lubricant.

References Cited in the file of this patent

UNITED STATES PATENTS

| | | |
|---|---|---|
| 1,679,161 | Kindervater | July 31, 1928 |
| 1,960,956 | Riedel | May 29, 1934 |
| 2,027,560 | Skillman | Jan. 14, 1936 |
| 2,124,034 | Hufferd | July 19, 1938 |
| 2,292,675 | Thiry | Aug. 11, 1942 |
| 2,398,848 | Newey | Apr. 23, 1946 |
| 2,424,431 | Booth | July 22, 1947 |
| 2,461,866 | Alldredge | Feb. 15, 1949 |
| 2,464,982 | Leighton | Mar. 22, 1949 |
| 2,479,339 | Gair | Aug. 16, 1949 |
| 2,728,975 | Potter | Jan. 3, 1956 |
| 2,732,233 | MacMillan et al. | Jan. 24, 1956 |
| 2,771,300 | Latzen | Nov. 20, 1956 |
| 2,797,929 | Herbenar | July 2, 1957 |
| 2,797,930 | Booth | July 2, 1957 |
| 2,827,303 | Herbenar | Mar. 18, 1958 |
| 2,835,521 | White | May 20, 1958 |
| 2,844,382 | Dick | July 22, 1958 |

FOREIGN PATENTS

| | | |
|---|---|---|
| 1,117,481 | France | Feb. 27, 1956 |